United States Patent [19]

Sheller

[11] 3,850,623

[45] Nov. 26, 1974

[54] METHOD FOR REDUCING URANIUM TETRAFLUORIDE TO METALLIC URANIUM

[75] Inventor: Otto P. Sheller, Oak Ridge, Tenn.

[73] Assignee: The United States of America as represented by the United States Atomic Energy Commission, Washington, D.C.

[22] Filed: Jan. 19, 1961

[21] Appl. No.: 83,853

[52] U.S. Cl. .............................. 75/84.1 R, 75/84.4
[51] Int. Cl. ............................................. C22b 61/04
[58] Field of Search ............................ 75/84.1, 84.4

[56] References Cited
UNITED STATES PATENTS

| | | | |
|---|---|---|---|
| 2,785,065 | 3/1957 | Spedding et al. | 75/84.1 |
| 2,787,538 | 2/1957 | Spedding et al. | 75/84.1 |
| 2,830,894 | 4/1958 | Spedding et al. | 75/84.1 |
| 2,834,672 | 5/1958 | Foster et al. | 75/84.1 |
| 2,890,110 | 6/1959 | Baker | 75/84.1 |
| 2,953,447 | 9/1960 | Schulz | 149/37 |
| 2,956,872 | 10/1960 | Avery | 75/84.1 |
| 2,960,398 | 11/1960 | Leaders et al. | 75/84.1 |
| 2,976,136 | 3/1961 | Heiskell | 149/37 |
| 3,088,822 | 5/1963 | Lloyd et al. | 75/84.1 R |
| 3,356,492 | 12/1967 | Delange et al. | 75/84.1 R |

*Primary Examiner*—Benjamin R. Padgett
*Assistant Examiner*—R. E. Schafer
*Attorney, Agent, or Firm*—John A. Horan; David Zachry

EXEMPLARY CLAIM

1. The method of preparing metallic uranium from $UF_4$ which comprises heating a reaction mixture comprising $UF_4$, calcium in excess of the stoichiometric amount required to reduce said $UF_4$, an ignition agent and Lithium until said mixture ignites, and separating the resulting metal from the resulting slag, said lithium being provided in said mixture in a proportion sufficient to produce a lithium fluoride content of approximately 15 to 30 mole percent in said slag, and said ignition agent being selected from the group consisting of iodine and a finely divided mixture of magnesium with an alkali metal iodate and an alkali metal peroxide.

7 Claims, No Drawings

METHOD FOR REDUCING URANIUM TETRAFLUORIDE TO METALLIC URANIUM

My invention relates to the preparation of metallic uranium and more particularly to preparation of metallic uranium by means of reduction of uranium tetrafluoride with calcium.

Metallic uranium is currently produced by reduction of uranium tetrafluoride with an alkaline earth metal such as magnesium or calcium. Although a less efficient reductant than calcium, magnesium is employed for large quantities of uranium metal because of its lower cost. Calcium is preferred for preparation of small batches of uranium metal where higher reduction efficiency outweighs the higher cost of calcium.

Reduction is effected by providing a powdered mixture of $UF_4$ and the reductant metal in a bomb-type reactor and heating the charged reactor until an exothermic reduction reaction is initiated. The reactor is then allowed to cool and the resulting solidified uranium metal is separated from reaction-product slag.

One of the problems presented in the use of calcium for reduction of $UF_4$ is obtaining clean separation of the uranium metal from the slag. Molten uranium metal and molten calcium fluoride are produced in the high-temperature reduction reaction. As the reaction mass cools the more dense uranium metal settles to the bottom of the reactor, passing through the rising slag. Because of its higher melting point (approximately 1,360°C.) the slag solidifies before the uranium metal (melting point approximately 1,150°C.). As a result uranium metal is retained within the slag, and the uranium body, or "button," contains indentations and inclusions of slag. The metal button then requires remelting and slag removal before further fabrication, and the slag must be chemically reprocessed to recover uranium values contained therein.

Some improvement in uranium-slag separation has been obtained by providing iodine in the reactant mixture. Iodine reacts exothermically with calcium to provide additional heat to the reaction mass and thus allow better separation. In addition the presence of iodine slightly lowers the slag melting point. Even with the use of iodine, however, rough uranium buttons with slag inclusions have resulted.

Another problem in this reaction is the extensive heating of the reaction mass required for initiation of the reduction reaction. The reaction is normally carried out in a metal bomb provided with a ceramic liner and packing such as magnesium oxide sand between the bomb and liner to prevent breaking of the liner upon firing. Externally applied heat must penetrate this non-conductive material and bring the reactant mixture to the ignition temperature. It is accordingly desired to provide a reaction mixture with a lowered ignition temperature. The addition of iodine has lowered the ignition temperature from approximately 515°C. to 410°C., but an even lower ignition temperature is desired.

It is, therefore, an object of my invention to provide an improved process for the reduction of $UF_4$ to metal with calcium.

Another object is to provide clean separation of uranium metal from slag in the reduction of $UF_4$ with calcium.

Another object is to provide a decreased ignition temperature in the reaction of $UF_4$ with calcium.

In accordance with my invention uranium metal is prepared by providing a reaction mixture comprising $UF_4$, excess calcium, an ignition agent and lithium in a sealed reduction bomb, heating said mixture until said mixture ignites, whereby uranium metal and slag are formed, and separating the resulting uranium metal from the resulting slag, said lithium being provided in a proportion sufficient to produce a lithium fluoride content in said slag of 15 to 30 mole percent. In this process uranium metal is obtained in the form of a smooth, high-density button free of slag inclusions, and the slag is essentially free of uranium.

I have found that the addition of metallic lithium to the reaction mass results in lowering of the slag melting point to a temperature approximately equal to the uranium melting point. Solidification of the slag is delayed sufficiently by this means to allow the uranium to collect in a smooth, coherent mass without slag inclusions.

Lithium metal is supplied in the reaction mixture in a proportion sufficient to provide a lithium fluoride content in the resulting $CaF_2$-LiF slag within the range of 15 to 30 mole percent. 15 mole percent is required to obtain adequate lowering of the slag melting point. At lithium fluoride concentrations of over 30 mole percent difficulty is encountered in removal of the reaction products from the reduction bomb. The physical form of the lithium in the reaction mixture is not critical, and the lithium may be conveniently supplied in the form of a metallic chunk.

Calcium is supplied to the reaction mixture in excess of the stoichiometric amount required for reduction of $UF_4$, i.e., 2 moles of calcium per mole of $UF_4$, in order to provide complete reduction of the $UF_4$. Up to 25 mole percent excess calcium may be employed, and approximately 15 mole percent excess is preferred. The calcium and $UF_4$ are supplied in powdered or granulated form and are intimately mixed prior to initiation of the reaction. The total quantity of these reactants in a reduction bomb charge is not critical.

An ignition agent is required to provide relatively low temperature, non-explosive ignition of the reaction mixture. Iodine as employed previously where the calcium-$UF_4$ reaction was conducted without added lithium may be employed for this purpose. Iodine may be supplied to the reaction mixture at a concentration of at least 0.05 moles per mole of uranium, and preferably within the range of 0.05 to 0.15 moles per mole of uranium.

Instead of iodine, however, it is preferred to employ a novel ignition agent in combination with the lithium additive. This novel ignition agent comprises a finely divided mixture of magnesium with an alkali metal iodate and an alkali metal peroxide. The ignition mixture is enclosed in a suitable capsule and inserted in the $UF_4$-calcium reaction mixture. Upon heating of the reaction bomb the ignition mixture ignites at a relatively low temperature to provide fast-burning, but non-explosive, initiation of the reduction reaction. Magnesium is supplied to the ignition mixture in the form of a powder or as magnesium chips. The magnesium is combined with approximately 3 to 26 mole percent of an alkali metal peroxide and approximately 13 to 33 mole percent of an alkali metal iodate. These ingredients are critical to the attainment of fast-burning, non-explosive ignition without contamination of the product metal. Because of their ready availability, sodium peroxide and potassium iodate are the preferred constituents. A mixture comprising approximately 25 weight percent magnesium, approximately 10 weight percent $Na_2O_2$ and 65 weight percent $KIO_3$ is particularly preferred.

The quantity of the ignition mixture employed in the $UF_4$-calcium reaction mixture is not critical. Although lesser amounts are effective in igniting the reaction mixture, an encapsulated mass of one to two grams is preferred since this amount is more readily handled than more minute quantities. The ignition mixture is disposed in a suitable inert container such as a commonly available gelatin capsule. In order to minimize the heating required for ignition of the $UF_4$-calcium reaction mixture it is preferred to place the ignition capsule in the lower portion of and near the outer periphery of the reaction mixture. The ignition capsule ignites at a temperature of approximately 250°C., setting off the $UF_4$-calcium reaction.

Uranium metal scrap such as turnings and bits of metal produced in metal fabrication may be recovered and reused by disposing the scrap in a reduction bomb along with the $UF_4$-calcium reaction mixture described above. The scrap is melted by the reduction reaction heat and collects in a metal button along with the newly reduced metal. Metal scrap may be provided at a proportion up to 50 percent of the total uranium in a reduction charge. In the use of the preferred embodiment of my above-described method wherein an ignition capsule is provided in the reaction mixture, it is preferred to dispose the capsule at approximately the center of the reaction mixture. The presence of scrap requires additional external heating, and incomplete melting may result if the ignition capsule is placed at the periphery of the reaction mixture.

The above-described ignition mixture may also be employed for initiating the reaction of a mixture of calcium and $UF_4$ in the methods previously employed wherein no lithium is provided in the reaction mixture.

In order to prevent contamination of the uranium metal the reduction reaction is carried out in a sealed reaction vessel and under an atmosphere of an inert gas such as helium or argon.

The method of my invention is not limited to a particular apparatus, and any of the previously known reduction-bomb reactors may be employed. Suitable apparatus comprises a stainless steel outer shell with a magnesium oxide liner and granulated magnesium oxide sand provided between the shell and liner to allow convenient removal of the reaction products. Heating of the reaction bomb may be readily effected by placing the bomb in a conventional induction furnace.

The reduced uranium metal is recovered by removing the cooled reaction mass from the reduction bomb. Having been prepared in the form of a smooth button, the metal separates readily from the slag. The metal may be fabricated as desired by conventional techniques such as casting, working, and machining.

My invention is further illustrated by the following examples.

EXAMPLE I

A reaction mixture consisting of 5,800 grams $UF_4$, 90.5 grams iodine, 1,430 grams calcium and 105 grams lithium was disposed in a reduction bomb consisting of a magnesium oxide crucible 6 inches in diameter and 13 inches high inserted in a sealed stainless steel shell, with magnesium oxide sand being provided between the shell and crucible. The $UF_4$, calcium and iodine were in the form of an intimately mixed powder, and the lithium was in the form of a metallic chunk. A magnesium oxide cover was placed over the crucible, and the reactor was purged, filled with argon and sealed. The bomb was heated in an induction furnace for 25 minutes to ignite the reaction mixture. The mixture ignited at a shell temperature of 595°C., and the shell temperature rapidly rose to a maximum of 875°C. The reduction bomb was then allowed to cool, and the resulting metal and slag were removed. The metal was in the form of a smooth button without visible indentations or slag inclusions. A uranium metal yield of 99.74 percent was obtained.

EXAMPLE II

A reaction mixture consisting of 5,800 grams $UF_4$, 227 grams iodine, 52 grams lithium and 1,570 grams calcium was disposed in the apparatus of Example I. The lithium was in the form of a coherent chunk, and the other constituents were in the form of an intimately mixed powder. The bomb was heated in an induction furnace for 18½ minutes, whereby the mixture was ignited at a shell temperature of 500°C. After being allowed to cool the resulting metal and slag were removed from the reduction bomb. Uranium metal was obtained at a yield of 99.4 percent in the form of a smooth button without slag inclusions.

EXAMPLE III

A reaction mixture comprising 5,800 grams $UF_4$, 1,529 grams calcium and 53 grams lithium was disposed in the apparatus of Example I. The $UF_4$ and calcium were in the form of an intimately mixed powder, and the lithium was in the form of a chunk. A gelatin capsule containing 1.3 grams of an intimately mixed powder consisting of 25 weight percent magnesium, 65 weight percent potassium iodate and 10 weight percent sodium peroxide was provided in the lowermost portion of the reaction mixture. The reduction bomb was then purged, filled with argon and sealed. The bomb was heated in an induction furnace for 16 minutes, whereby the reaction mixture was ignited at a shell temperature of 440°C. After being allowed to cool the resulting metal and slag were removed from the reduction bomb. Uranium metal was obtained at a yield of 99.4 percent in the form of a smooth button without slag inclusions.

The above examples are merely illustrative and are not to be construed as limiting the scope of my invention which is limited only as indicated in the appended claims It is also to be understood that numerous variations in apparatus and procedure may be employed by one skilled in the art without departing from the scope of my invention.

Having thus described my invention, I claim:

1. The method of preparing metallic uranium from $UF_4$ which comprises heating a reaction mixture comprising $UF_4$, calcium in excess of the stoichiometric amount required to reduce said $UF_4$, an ignition agent and lithium until said mixture ignites, and separating the resulting metal from the resulting slag, said lithium being provided in said mixture in a proportion sufficient to produce a lithium fluoride content of approximately 15 to 30 mole percent in said slag, and said ignition agent being selected from the group consisting of iodine and a finely divided mixture of magnesium with an alkali metal iodate and an alkali metal peroxide.

2. The method of preparing metallic uranium from $UF_4$ which comprises disposing a reaction mixture consisting of intimately mixed $UF_4$ and calcium in excess of the amount required to reduce said $UF_4$, an ignition agent and metallic lithium in a sealed reduction bomb provided with an inert atmosphere, heating said mixture until said mixture ignites, whereby uranium metal and slag are formed, and separating the resulting metal from the resulting slag, said metallic lithium being provided in said reaction mixture in a proportion sufficient to produce a lithium fluoride content of approximately 15 to 30 mole percent in said slag said ignition agent being selected from the group consisting of iodine at a proportion of at least 0.05 mole per mole uranium and a finely divided mixture consisting of 3 to 26 mole percent of an alkali metal peroxide, 13 to 33 mole percent of an alkali metal iodate and the balance magnesium.

3. The method of preparing metallic uranium from $UF_4$ which comprises heating a mixture comprising $UF_4$, calcium in excess of the stoichiometric amount required to reduce said $UF_4$, iodine in a proportion at least approximately 0.05 moles per mole of uranium and lithium until said mixture ignites, and separating the resulting slag, said lithium being provided in said mixture in a proportion sufficient to produce a lithium fluoride content in said slag of approximately 15 to 30 mole percent.

4. The method of preparing metallic uranium from $UF_4$ which comprises disposing a mixture consisting of intimately mixed $UF_4$ and calcium in excess of the stoichiometric amount required to reduce said $UF_4$, iodine in a proportion at least approximately 0.05 moles per mole of uranium, and lithium in a sealed reduction bomb provided with an inert atmosphere, heating said mixture until said mixture ignites, whereby metallic uranium and slag are formed, and separating said slag from said metallic uranium, said lithium being provided in said mixture in a proportion sufficient to produce a lithium fluoride content in said slag of approximately 15 to 30 mole percent.

5. The method of preparing metallic uranium from $UF_4$ which comprises providing an ignition agent comprising a finely divided mass consisting of 3 to 26 mole percent of an alkali metal peroxide, 13 to 33 mole percent of an alkali metal iodate and the balance magnesium in a mixture comprising $UF_4$, calcium in excess of the stoichiometric amount required to reduce said $UF_4$ and lithium, heating said mixture until said mixture ignites, whereby uranium metal and slag are formed, and separating said uranium metal from the slag, said lithium being provided in said mixture in a proportion sufficient to produce a lithium fluoride content in said slag of approximately 15 to 30 mole percent.

6. The method of claim 5 in which said ignition agent consists of a finely divided mixture of approximately 25 weight percent magnesium, approximately 65 weight percent potassium iodate and 10 weight percent sodium peroxide.

7. The method of claim 5 in which an encapsulated mass of approximately 1 to 2 grams of said ignition agent is provided in said mixture.

* * * * *